US00RE47253E

(19) United States
(12) Reissued Patent
Anders Nesz et al.

(10) Patent Number: US RE47,253 E
(45) Date of Reissued Patent: *Feb. 19, 2019

(54) METHOD AND ARRANGEMENT FOR PREVENTING ILLEGITIMATE USE OF IP ADDRESSES

(71) Applicant: TELEFONAKTIEBOLAGET L M ERICSSON (PUBL), Stockholm (SE)

(72) Inventors: Peter Anders Nesz, Årsta (SE); Thomas Johansson, Haninge (SE); Michael Valentin Juhl, Them (DK)

(73) Assignee: Telefonaktiebolaget LM Ericsson (publ), Stockholm (SE)

( * ) Notice: This patent is subject to a terminal disclaimer.

(21) Appl. No.: 14/609,631

(22) Filed: Jan. 30, 2015

Related U.S. Patent Documents

Reissue of:
(64) Patent No.: 7,996,537
Issued: Aug. 9, 2011
Appl. No.: 10/531,753
PCT Filed: Nov. 6, 2002
PCT No.: PCT/SE02/02021
§ 371 (c)(1),
(2) Date: Sep. 20, 2005
PCT Pub. No.: WO2004/042999
PCT Pub. Date: May 21, 2004

U.S. Applications:
(63) Continuation of application No. 13/962,787, filed on Aug. 8, 2013, now Pat. No. Re. 45,445, which is an application for the reissue of Pat. No. 7,996,537.

(51) Int. Cl.
*G06F 15/16* (2006.01)
*H04L 29/06* (2006.01)
*H04L 29/12* (2006.01)

(52) U.S. Cl.
CPC .... *H04L 29/06102* (2013.01); *H04L 61/2015* (2013.01); *H04L 63/0236* (2013.01);
(Continued)

(58) Field of Classification Search
CPC ..... H04L 29/06102
(Continued)

(56) References Cited

U.S. PATENT DOCUMENTS 5,884,024 A * 3/1999 Lim et al. ..... 726/3
6,393,484 B1 * 5/2002 Massarani ..... 709/227
(Continued)

FOREIGN PATENT DOCUMENTS

EP 0520709 A2 12/1992
WO WO 0147179 A1 6/2001

OTHER PUBLICATIONS

Security Architecture for DHCP, Dynamic Host Configuration WG, Internet Draft, draft-ietf-dhc-security-arch-01.txt Publication date: Jul. 30, 1997.

(Continued)

*Primary Examiner* — Cameron Saadat

(57) ABSTRACT

Illegitimate use of IP addresses is counteracted. A network (1) includes a switch (5) with ports (P1,P2,P3) to subscribers (6,6A) and a port (PN) to a core network (2) with DHCP servers (4, 4a,4b). The switch includes a database (MAC1, MAC2), port numbers (P1, P2) and VLAN identities (VLAN1, VLAN2) for the subscribers (6, 6A) and the filter has a list over trusted DHCP servers. Initially only DHCP messages from the subscribers are allowed. When the subscriber (6) requests (M1, M3) for an IP address it is checked that it is a DHCP message with valid subscriber values (MAC1, P1, VLAN1). A respond (M2, M4) with an allocated IP address (IP1) and lease time interval (T1) is checked to come from a trusted DHCP server. If so, a list in the filter (9) with correct information is dynamically generated (MAC1, P1, VLAN1, IP1, T1). A message (M5) from the subscriber (6) with false IP address is discarded by the filter.

(Continued)

Attempts by the subscriber to use false IP address are counted and a warning signal is generated.

10 Claims, 5 Drawing Sheets

(52) U.S. Cl.
CPC ..... *H04L 63/1466* (2013.01); *H04L 69/161* (2013.01); *H04L 69/16* (2013.01)

(58) Field of Classification Search
USPC ..... 709/227
See application file for complete search history.

(56) References Cited

U.S. PATENT DOCUMENTS 6,427,170 B1 * 7/2002 Sitaraman et al. ..... 709/226
7,079,499 B1 * 7/2006 Akhtar et al. ..... 370/310
7,127,524 B1 * 10/2006 Renda et al. ..... 709/245
RE45,445 E * 3/2015 Anders Nesz ..... H04L 61/2015 709/223
2002/0023160 A1 2/2002 Garrett et al.
2002/0065919 A1 * 5/2002 Taylor et al. ..... 709/226
2003/0233576 A1 * 12/2003 Maufer et al. ..... 713/201
2004/0044778 A1 * 3/2004 Alkhatib et al. ..... 709/228
2004/0064559 A1 * 4/2004 Kupst et al. ..... 709/226
2004/0107286 A1 * 6/2004 Larson et al. ..... 709/229
2007/0299942 A1 * 12/2007 Lu et al. ..... 709/220

OTHER PUBLICATIONS

"Authentication for DHCP Messages", Request for Comments: 3118. ED.: R. Droms, Cisco Systems; W. Arbaugh, University of Maryland, Jun. 2001, p. 2, line 2-line 38, and abstract.
Swedish Patent Office, International Search Report for PCT/SE02/02021, dated Apr. 28, 2003.

* cited by examiner

| | | | |
|---|---|---|---|
| 31 | Subscriber | MAC1 | MAC2 |
| 32 | Port no. | P1 | P2 |
| 33 | VLAN identity | VLAN1 | VLAN2 |
| 34 | IP addess | IP1 | IP2 |
| 35 | Lease time | T1 | T2 |

TAB1

METHOD AND ARRANGEMENT FOR PREVENTING ILLEGITIMATE USE OF IP ADDRESSES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,996,537, which was the National Stage of International Application No. PCT/SE02/02021, filed Nov. 6, 2002. The reissue applications are (1) application Ser. No. 13/962,787 and (2) application Ser. No. 14/609,631 (the present application):*

*(1) Reissue application Ser. No. 13/962,787 was an application for reissue of U.S. Pat. No. 7,996,537, and was granted on Mar. 11, 2015 as RE45,445.*

*(2) The present application is a continuation reissue of application Ser. No. 13/962,787, now RE45,445.*

*The disclosures of all of these documents are fully incorporated herein by reference.*

*This application is a continuation reissue of application Ser. No. 13/962,787, which is an application for reissue of U.S. Pat. No. 7,996,537, which was the National Stage of International Application No. PCT/SE02/02021, filed Nov. 6, 2002.*

TECHNICAL FIELD OF THE INVENTION

The present invention relates to a method and a device in an

IP network, which counteracts illegitimate use of IP addresses.

DESCRIPTION OF RELATED ART

Subscribers in an IP network can use IP addresses that are not acquired in a legitimate way. The subscriber can use someone else's IP address or an IP address currently not in use. The subscriber, who may be e.g. an enterprise, is connected to a broadband island, and uses the IP address to identify itself on the network. If the subscriber has abuse intentions it is appealing to use such an illegitimate IP address. Abuse tracking is namely based on the IP address and the abuser would benefit from the illegitimate address, since the abuser would be more difficult to track at an investigation.

In the international patent application WO 98/26550 is disclosed a system for allocating and using IP addresses in a network with subscriber systems. Each subscriber system is connected to a DHCP server via a cable modem. The DHCP server leases IP addresses to the subscriber systems and works in combination with a secure DHCP relay agent and a secure IP relay agent. When a subscriber system sends a DHCP request message, the DHCP relay agent adds a trusted identifier to the message and transmits it to the DHCP server. The trusted identifier, which is associated with the requesting subscriber system, is used by the DHCP server to prevent the subscriber system to access IP address leases of other subscriber systems. The DHCP server also counts the number of IP address leases per trusted identifier and restricts it to a predetermined number. The system requires a non-standard DHCP server and subscriber system.

U.S. Pat. No. 6,061,798 discloses a firewall for isolating network elements from a publicly accessible network. All access to protected network elements must go through the firewall, operating on a stand alone computer. An proxy agent, specifically assigned to an incoming request, verifies the authority of the request to access a network element indicated in the request. Once verified, the proxy agent completes the connection to the protected network on behalf of the source of the incoming request.

Its known in the art to prevent misuse of IP addresses by a filter in a switch, which is connected to a subscriber. A subscriber's data frames are filtered for illegitimate addresses. The filter is built up and is updated by a network operator.

SUMMARY OF THE INVENTION

The present invention deals with the abovementioned problem how to restrict the use of allocated IP addresses in an IP network to legitimate ones.

Another problem is how to prevent a subscriber to use per se legitimate IP addresses, which the subscriber has obtained in an illegitimate way.

Still a problem is how to prevent the subscriber to make a great number of attempts to illegitimately use IP addresses.

Still another problem is that an operator has to buildup and update a filter for statically allocated addresses.

The problem is solved by an IP filter device with subscriber identifications and corresponding IP addresses. Data frames from the subscribers have to have the correct source IP address to pass the filter device. The IP filter is successively updated as new subscriber IP addresses are used. In case of IP addresses being allocated by DHCP (Dynamic Host Configuration Protocol) servers, only trusted servers are allowed to allocate subscriber IP addresses to the subscribers.

The IP filter is dynamically updated in the following way. A subscriber requests for an IP address. An address response with an allocated IP address from a DHCP server is analysed both to be a DHCP frames and to come from one of the trusted DHCP servers, which servers are noted on a list. The allocated IP address and its lease time is stored in the IP filter together with an identification of the subscriber. When the lease time is out the subscriber identification and the IP address are deleted from the filter. New subscribers are stored successively. Traffic from one of the subscribers has to have the subscriber's assigned IP address as source address to pass the filter. Attempts from a subscriber to use illegitimate IP addresses are counted and at a predetermined number of attempts a warning is generated.

A purpose with the invention is to restrict the use of IP addresses to legitimate ones.

Another purpose is to prevent a subscriber to use per se legitimate IP addresses which, the subscriber has obtained in an illegitimate way.

Still a purpose is how to prevent the subscriber to make a great number of attempts to illegitimately use IP addresses.

Yet another purpose is that the mentioned IP address limitations will work automatically in an environment with dynamically allocated IP addresses.

The invention has the advantage that only trusted DHCP servers can allocate IP addresses.

Another advantage is that a subscriber can use only legitimate IP addresses obtained in a legitimate way.

A further advantage is that it is possible to prevent repeated attempts to get IP addresses.

Still another advantage is that a subscriber, that intends to misuse the network, can't make tracing more difficult by using an IP address obtained illegitimately.

Also, advantages are that an operator does not need to build up and update a filter, an automated process is not affected by human errors and management of the system is cheap.

The invention will now be more closely described with the aid of embodiments in connection with the enclosed drawings.

DETAILED DESCRIPTION OF EMBODIMENTS

Figure 1:
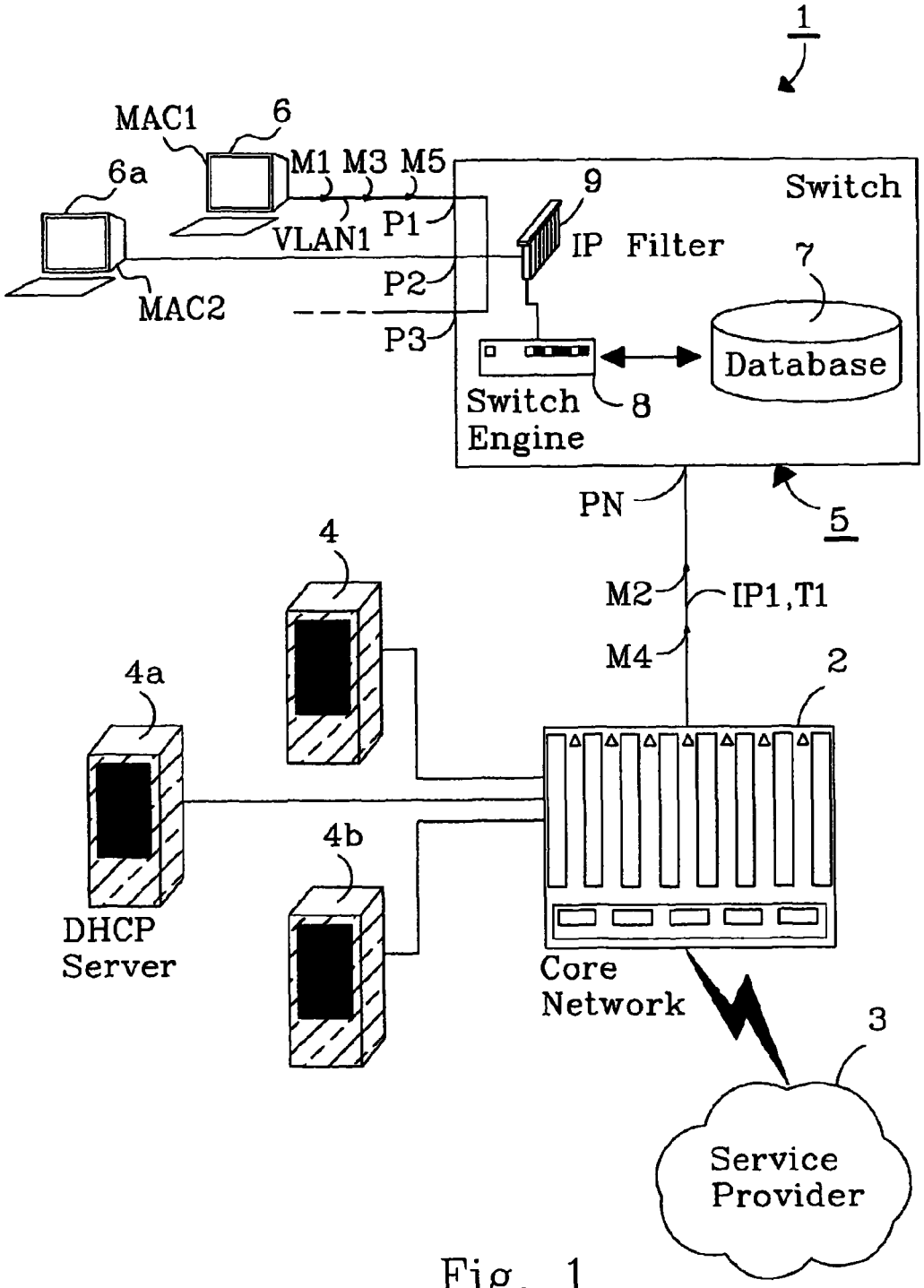
FIG. 1 shows a view over an IP network.

FIG. 1 shows a view over a simple IP network 1. The network 1 includes a core network 2 which is connected to a service provider 3, DHCP servers 4, 4a and 4b and to a switch 5 via an uplink port PN. The switch in turn includes a switch engine 8, which is connected to a database 7 and an IP filter device 9. The filter device is connected to physical switch ports P1, P2, P3 for subscribers. A subscriber device 6 is connected to the core network 2 via the IP filter 9 in the switch 5. The subscriber device 6 has in conventional manner a MAC address MAC1 and is connected to the physical switch port P1 and to a virtual LAN VLAN1 on that port. Also, a subscriber 6A with a MAC address MAC2 is connected to the port with the identification P2 on a virtual LAN VLAN2 and the switch also has a further port P3.

Conventional dynamic address allocation works in short in the following manner. A subscriber in a conventional IP network with dynamic address allocation wants to have an IP address, which he has paid for. He then broadcasts a DHCP (Dynamic Host Configuration Protocol) request. A DHCP server notes the request and responds with an IP address and a lease time interval for the address. The subscriber now can communicate with other subscribers or a service provider via the network. A subscriber with abuse intentions can acquire an IP address in an illegitimate way, which makes it more difficult to track him on the network. The subscriber can e.g. get the address from a bogus DHCP server or can himself write an address that belongs to someone else or is currently not in use. The subscriber can also behave in other unacceptable ways, e.g. request and get a great number of IP addresses and thereby make it difficult for other subscribers to get an address.

In brief the switch 5 works in the following manner. To prevent misuse of allocated IP addresses the inventive switch 5 is equipped with the filter 5 for IP address spoofing protection, that can be enabled or disabled per virtual LAN. The switch 5 also has a list L1 over trusted ones of the DHCP servers, in the embodiment the servers 4, 4a and 4b. The switch is configured such that, when the spoofing protection is enabled, all IP addresses are blocked on the subscribers switch port. The only traffic allowed is DHCP traffic to the trusted DHCP servers, DHCP broadcasts and sending of ARPs (Address Resolution Protocol). When the subscriber 6 needs an IP address he broadcasts a DHCP request. The DHCP servers 4, 4a, 4b read the request and responds with a frame, that indicates an assigned subscriber IP address IP1 and a lease time interval T1 for this address. The frame also has a source IP address defining the respective DHCP server. The switch 5 checks via this source IP address if the frame is sent by the trusted DHCP servers 4, 4a, 4b on the list. It also checks that it really is a DHCP frame that is received. The switch 5 has stored in the database 7 the MAC address MAC1 of the subscriber 6, an identification of its physical port P1 and its virtual LAN VLAN1. The switch now dynamically configures the filter 9, which per subscriber includes the following values: The subscriber MAC address MAC1, the subscriber's port identification P1, the subscriber's virtual LAN VLAN1, the received subscriber IP address IP1 and the lease time interval T1 for the IP address. When the subscriber 6 sends a message the switch compares the subscriber source IP address in the transmitted frames with the assigned subscriber IP address IP1 in the filter 9 on the subscriber's port identification P1 and virtual LAN VLAN1. With correct IP address the frames pass the filter, else the frames are discarded. When the lease time interval T1 is out the subscriber identification and the assigned subscriber IP address IP1 is deleted from the filter (9). More details of the above briefly described processes will be given in connection with FIG. 5.

In a corresponding manner as above the IP filter 9 will be dynamically configured with subscriber values for the subscriber 6A: The port identification P2, the virtual LAN VLAN2, an allocated subscriber IP address IP2 and a corresponding lease time interval T2.

Statically allocated IP addresses can in one alternative be written directly into the IP filter 9. In another alternative the DHCP servers have the statically assigned IP address for a subscriber. The latter makes a conventional DHCP request for its static IP address. The DHCP server notes the subscriber's MAC address in the request and always allocates the subscriber's statically assigned IP address. Statically assigned IP addresses of the first type can be used e.g. when applications on a computer can't utilize DHCP requests for an IP address.

Figures 2, 3:
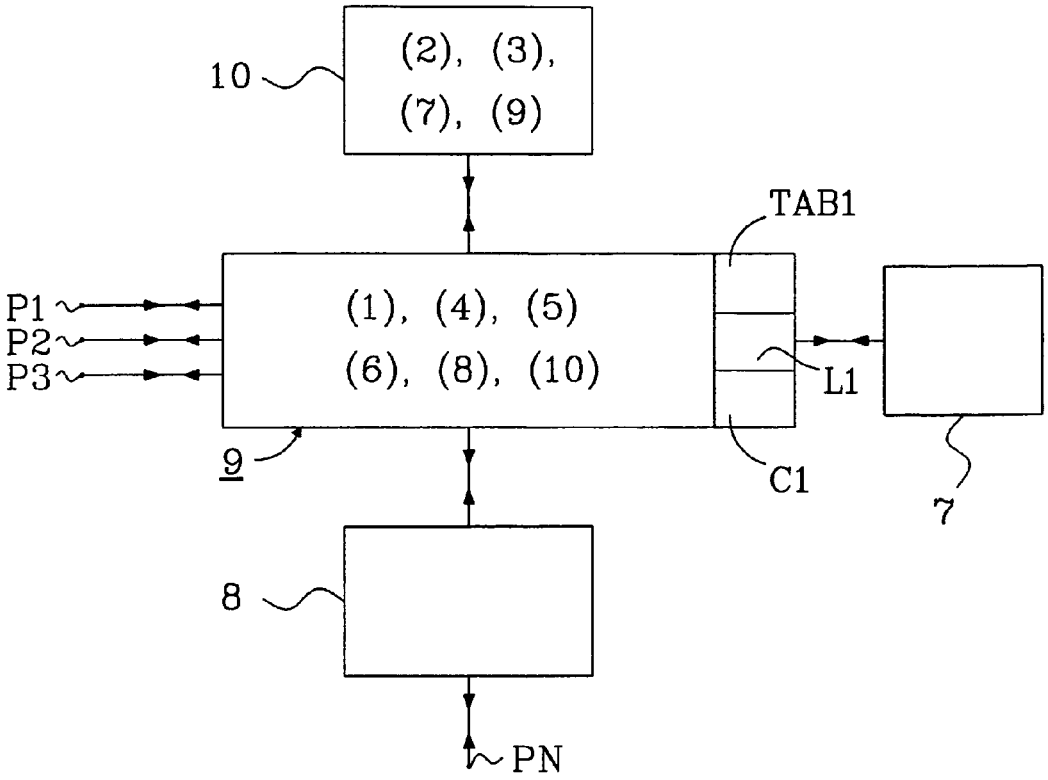
FIG. 2 shows a block schematic over a switch.
FIG. 3 shows a table in the switch.

In FIG. 2 the switch 5 is shown in some more detail. The IP filter 9 is connected to the switch ports P1, P2 and P3 and to the data base 7. It is also connected to the switch engine 8 and to a classifier 10. In the database 7 is stored the subscriber's MAC address MAC1, its port identification P1 and the virtual LAN identity VLAN1. The IP filter 9 has a list over the trusted DHCP servers and also a subscriber table, which list and table will be described in connection with FIG. 3. The classifier 10 checks if transmitted data frames come from or to a subscriber and whether the DHCP message is a DHCPACK message or some other DHCP message. Which operations, in more detail, the respective switch part 7,8,9 and 10 performs when the subscriber 6 makes DHCP requests or exchanges messages with the network 2 and the service providers 3 will be described in connection with FIG. 5.

Figure 6:
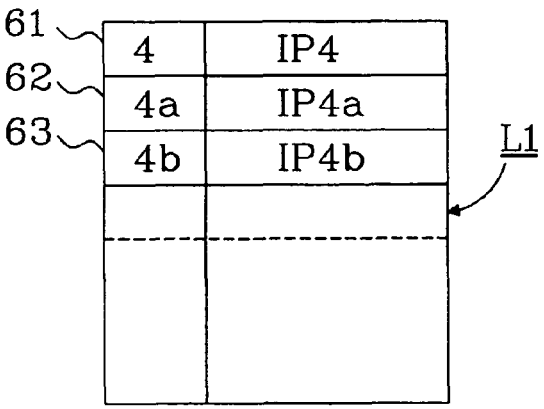
FIG. 6 shows a block schematic over a list.

It was mentioned above that the filter 9 was configured with subscriber values. The values are stored in a filter table TAB1, which is shown in FIG. 3. In a field 31 the different subscribers 6, 6A are stored with their respective MAC addresses MAC1 and MAC2. A field 32 gives the subscriber's port number P1 respective P2 and a field 33 gives the identities VLAN1 respective VLAN2 for the subscriber's virtual LAN: s. In a field 34 the subscriber IP addresses IP1 respective IP2 are written and in a field 35 the address lease time intervals T1 respective T2 are written. In FIG. 6 is shown a list L1 having fields 61, 62, 63 for the respective trusted DHCP servers 4, 4a and 4b with their IP address IP4, IP4a and IP4b.

Figure 4:
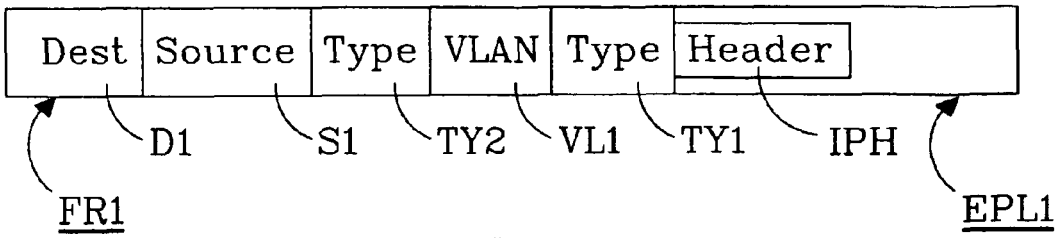
FIG. 4 shows a block schematic over an IP frame.

The communication in the network 1 is performed in accordance with the TCP/IP Seven Layer Stack. In FIG. 4 is shown an Ethernet frame FR1 according to the standard IEEE802.1q. The frame has a field D1 for a destination MAC address and a following field S1 for a source MAC address.

It also has a field TY2 indicating that VLAN is in use. A field VL1 points out which virtual LAN that is concerned by a virtual LAN tag. In the present example this tag is the virtual LAN identity, exemplified by the identities VLAN1 and VLAN2. The frame includes a field TY1 for defining a type of Ethernet frame. A field EPL1 contains the Ethernet payload including an IP header IPH with source and destination IP addresses, the lease time interval and the message that is to be transmitted.

Figure 5:
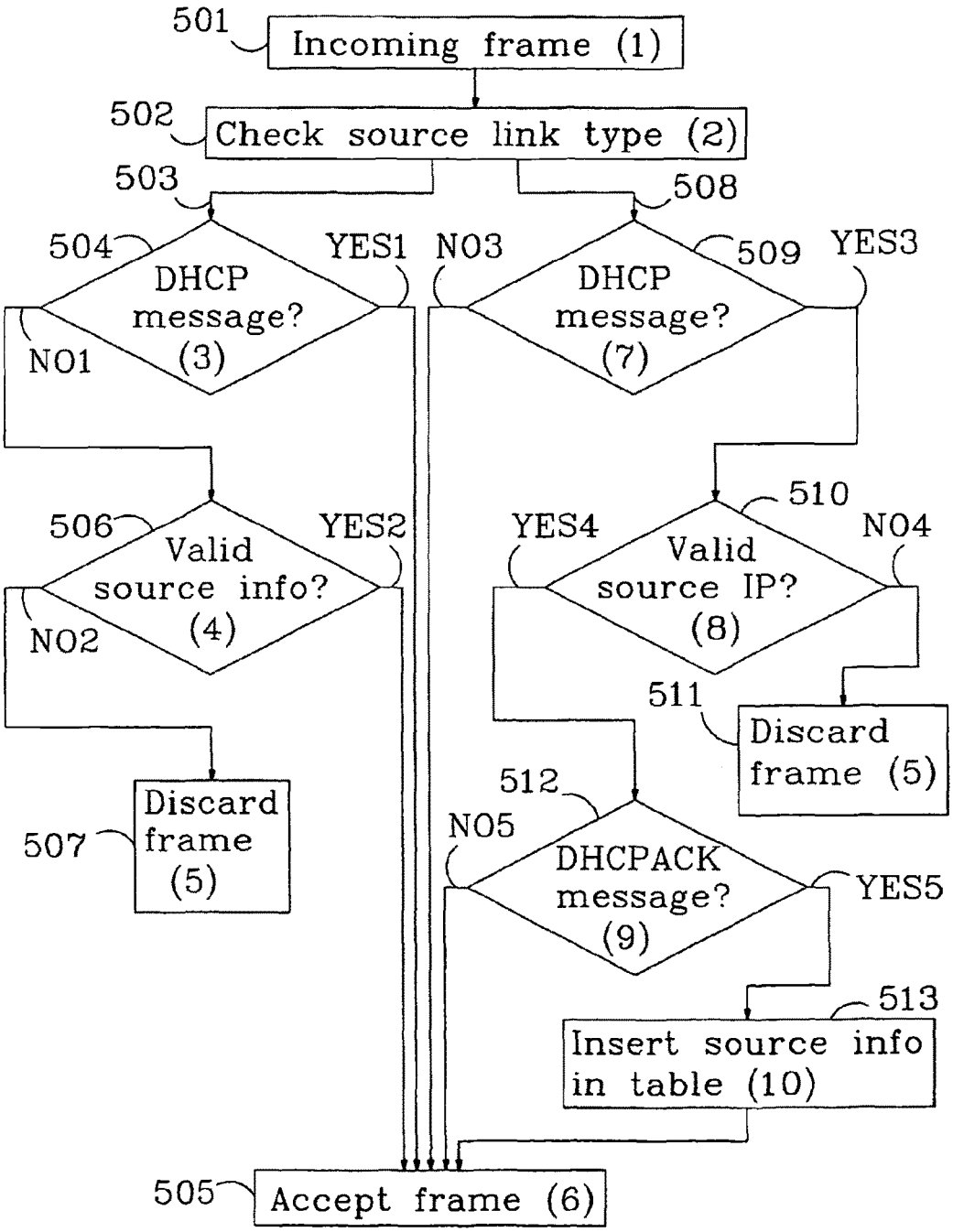
FIG. 5 shows a flow chart for procedures in the switch.

FIG. 5 is a flow chart describing an embodiment of different tasks that the switch 5 performs. In a block 501 the switch receives an incoming frame and this task is denoted by (1) in the block. In a block 502 a task (2) is performed, including checking from where the frame comes. The switch has both the subscriber ports P1, P2, P3 and the network port PN, and it is checked on which type of port the frame is received.

In an alternative 503 the incoming frame comes on one of the subscriber ports P1, P2 or P3. In a block 504 then a task (3) is performed, including a check whether the frame is a DHCP message. This is checked by checking the source and destination port numbers in the UDP message, given that the system is restricted such that only DHCP messages may use port 67 and 68. If the DHCP message check fails it implies that someone is using ports 67 and 68 and the message is discarded. If the frame is found to be a DHCP message, according to an alternative YES1, the frame is accepted by a block 505. This block performs a task (6), which includes that the frame is forwarded and in this case forwarded to the core network 2. If the frame is not a DHCP message, according to an alternative NO1, a task (4) is performed in a block 506. The task (4) includes a check whether a frame source information is valid. It is checked that the layer 2 source MAC address, the layer 3 IP address, the lease time interval and in actual cases the identification of the virtual LAN are all valid on the actual port. In the present embodiment it is in other words checked in the table TAB1 that the MAC address MAC1, the IP address IP1, the lease time interval T1 and the LAN identification VLAN1 are valid on the port P1. In an alternative NO2 the check task (4) shows that the source information is not valid and in a block 507 a task (5) is performed which implies that the frame is discarded. In an alternative YES2 for the block 506 the source information is valid and the frame is accepted in the block 505 by performing the task (6).

The block 502 has the task (2) by which it can in an alternative 508 detect that the frame comes from the core network 2 on the port PN. In a block 509 a task (7) is performed, which includes the check whether the frame is a DHCP message. In an alternative NO3, when the frame is not a DHCP message, the frame is accepted in the block 505, which performs the task (6). In an alternative YES3, when the frame is a DHCP message, the frame is checked in a block 510 performing a task (8). This task includes a question whether the DHCP message originates from a valid DHCP server, i.e. is a server that is stored in the list L1. In an alternative NO4 the server is not valid and the frame is discarded in a block 511 performing the task (5). In another alternative YES4 the server is valid and a check is performed in a block 512 performing a task (9). The check includes a question whether the frame is a DHCP acknowledge message. In an alternative NO5, when the frame is not an acknowledge message, the frame is accepted in the block 505. In an opposite alternative YES5 the frame is an acknowledge message. It is then handled in a block 513 performing a task (10). This task includes that the layer 3 IP address and the lease time interval are added in the database 7. Then the information about the layer 2 source MAC address, the layer 3 IP address, the port identification, the lease time interval and the virtual LAN identification for the subscriber are inserted in the table TAB1. The frame is then accepted, task (6) in the block 505.

In FIG. 2 it is denoted which parts of the switch 5 that performs the different tasks. The IP filter 9 performs the task (1) of receiving an incoming frame, the task (4) concerning frame source information, the task (5) handling discarding of frames, the task (6) of accepting a frame, the task (8) handling the question of valid DHCP server and the task (10) of inserting values in the filter table TAB1. The classifier 10 performs the task (2) of checking from where the frames come, the task (3) of checking whether a frame is a DHCP message from a subscriber, the task (7) of checking whether a frame is a DHCP message from the core network and the task (9) whether a frame is an acknowledge message.

In connection with FIG. 1 it was briefly described the processes when the subscriber 6 gets the IP address IP1 and then sends a message. First the process of getting the address will be more closely described in connection with FIG. 5. The subscriber 6 sends a DHCP discovery message M1 which is received by the switch 5 according to the block 501, task (1). In the block 502, task (2), the origin of the message M1 is checked and according to the alternative 503 the port P1 is decided. According to the block 504, task (3) and the alternative YES1, the message M1 is a DHCP message that is accepted in the block 505, task (6) and is forwarded to the core network 2.

One or more of the DHCP servers 4, 4a, 4b returns each a DHCP offer message M2 with an offered IP address. According to the block 501, task (1), the message M2 is received and in the block 502, task (2), its origin is checked. The port PN is decided according to the alternative 508 and in the block 509, task (7), and the alternative YES3 it is noted that the message M2 is a DHCP message. According to the block 510, task (8) and alternative YES4, the DHCP server 4 is valid. In the block 512, task (9) and alternative NO5, the message M2 is pointed out not be a DHCP acknowledge message and in the block 505, task (6), the DHCP offer message M2 is forwarded to the subscriber 6.

The subscriber 6 now selects one of the offered IP addresses, in the embodiment the address IP1 from the server 4. The subscriber requests for the address IP1 by a DHCP request M3 which is received by the switch 5 according to the block 501, task (1). In the block 502, task (2), the origin of the message M3 is checked and according to the alternative 503 the port P1 is decided. According to the block 504, task (3) and the alternative YES1, the message M3 is a DHCP message that is accepted in the block 505, task (6) and is forwarded to the core network 2.

The selected one of the DHCP servers, server 4, returns a DHCP acknowledge message M4, confirming the offered IP address IP1. According to the block 501, task (1), the message M4 is received and in the block 502, task (2) its origin is checked. The port PN is decided according to the alternative 508 and in the block 509, task (7), and the alternative YES3 it is noted that the message M4 is a DHCP message. According to the block 510, task (8) and alternative YES4, the DHCP server 4 that has sent the message M4 is valid. In the block 512, task (9) and alternative YES5, the message M4 is pointed out to be a DHCP acknowledge message (DHCPACK). It is then handled in the block 513, task (10) by which the information about the subscriber's layer 2 source MAC address MAC1, the received layer 3 IP address IP1, the port identification P1, the virtual LAN identification VLAN1 and the lease time interval T1 are inserted in the table TAB1. The message M4 is thereby accepted and in the block 505, task (6), the DHCP acknowledge message M4 is forwarded to the subscriber 6. The subscriber now has a valid IP address.

It should be noted that a subscriber, e.g. the subscriber 6, can legitimately use more than one IP address. The subscriber makes an agreement with an operator and obtains in this legitimate way further subscriptions for IP addresses. The number of legitimate IP addresses is noted in the database 7. The IP addresses themselves are obtained from the trusted servers in the same way as the address IP1 and are noted in the filter table TAB1.

The subscriber 6 now wants to utilize a service from the service provider 3 and sends a message M5 in FIG. 1. According to the block 501, task (1), the switch 5 receives the message M5. In the block 502, task (2), it is checked from where the message M5 comes. In the alternative 503 it comes on the subscriber port P1. In the block 504, task (3), it is checked whether the message M5 is a DHCP message. As it is not so, according to the alternative NO1, it is checked in the table TAB1, according to the block 506, task (4), that the layer 2 source MAC address MAC1, the layer 3 IP address IP1, the lease time interval T1 and the virtual LAN identification VLAN1 are all valid on the actual port P1. In the alternative YES2 the information is valid and the message M5 is accepted in the block 505, task (6). The message is now forwarded to the service provider 3.

Figure 7:
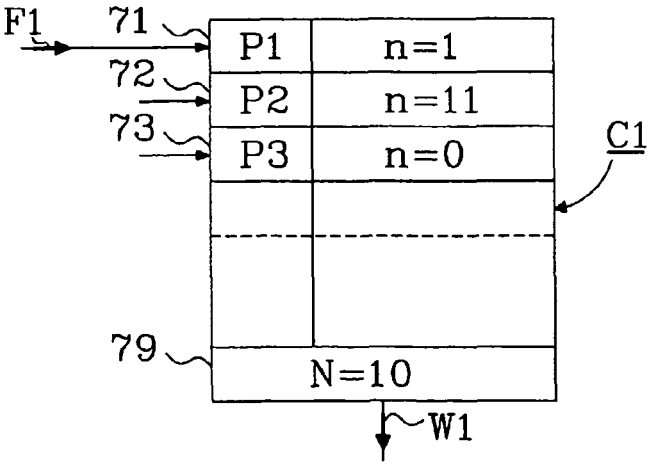
FIG. 7 shows a block schematic over a counter.

If the subscriber tries to send a frame like the frame FR1 in FIG. 4 as a message and uses an invalid IP address IPX in the IP header IPH, this is revealed at the check in the table TAB1. According to the alternative NO2 the frame FR1 is then discarded in block 507, task (5). It was mentioned above that one problem is how to prevent the subscribers, 6 and 6A, to make a great number of such attempts, to illegitimately use IP addresses. This problem is solved by including a counter in the task (5) in the IP filter 9. In FIG. 7 a block schematic over such a counter C1 is shown. The counter has fields 71, 72, 73 in which are written the respective subscriber ports P1, P2 and P3 and corresponding number n of false attempts, i.e. attempts with invalid IP addresses. It also has a comparison element 79 in which is written a number N of allowed false attempts. In the example the subscriber 6 on port P1 has made one false attempt. When the frame with the invalid address is discarded, a message F1 is sent to the counter C1, field 71 for the port P1. In this field is set n=1, which is compared to N=10, resulting in no action. The subscriber 6A on the port P2 has made n=11 false attempts. As this number exceeds the allowed number N=10 a warning message W1 is generated.

Figure 8:
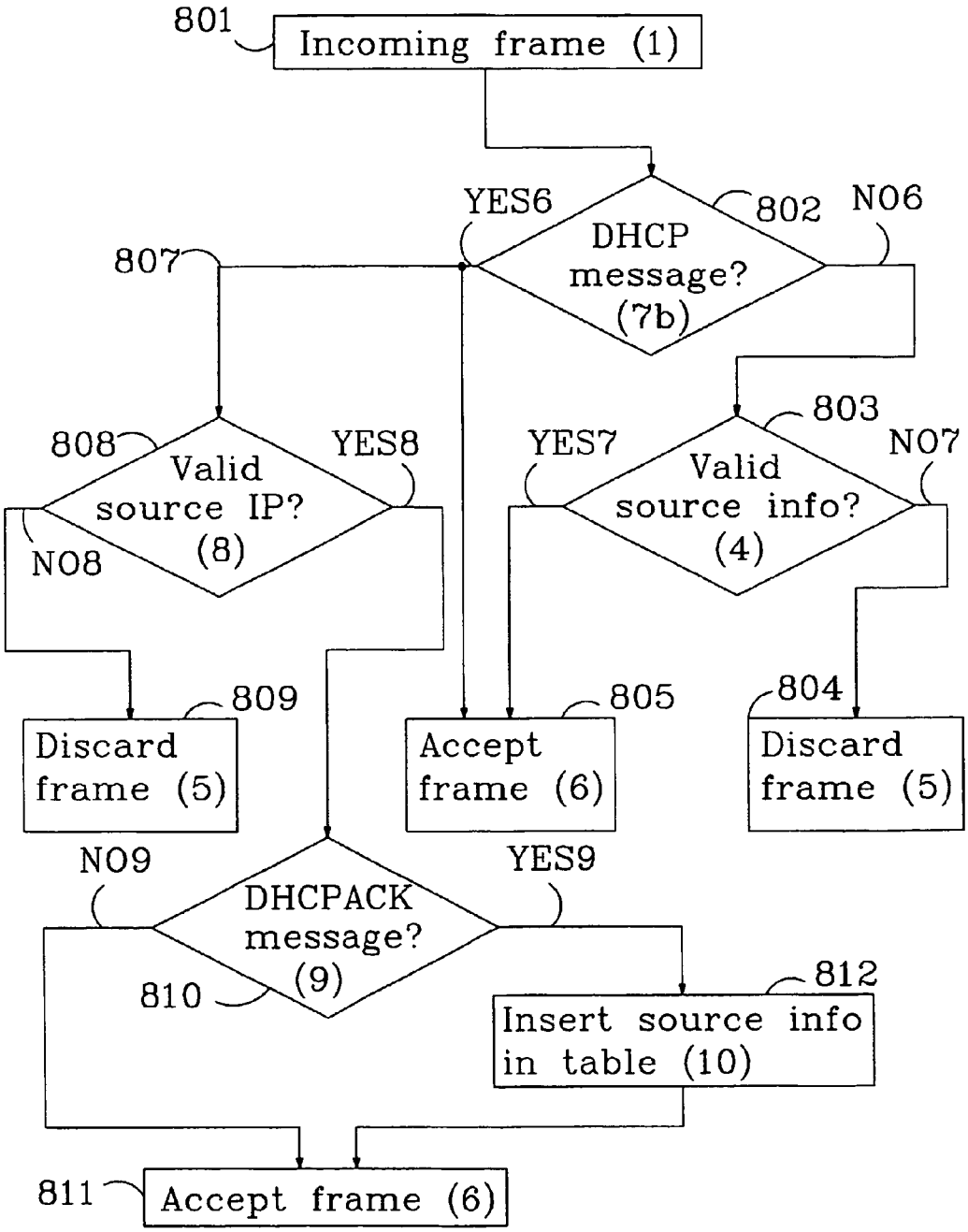
FIG. 8 shows a flow chart for alternative procedures in the switch.

In FIG. 8 is shown a flow chart for an alternative embodiment of the procedures in the switch 5. In a block 801 the switch receives an incoming frame and this task is, as above, denoted by (1) in the block. In a block 802 a task (7b) is performed, including checking whether the frame is a DHCP frame. If it isn't according to an alternative NO6, the task (4) is performed in a block 803. This task includes the check whether the frame source information is valid and is performed with the aid of the table TAB1 in the filter 9. If the frame source information is invalid, according to an alternative NO7, the frame is discarded in a block 804 performing the task (5). If instead the frame source information is valid, according to an alternative YES7, the frame is accepted by the task (6) performed in a block 805. If it is found in the block 802 that the incoming frame is a DHCP frame, alternative YES6, the task (7b) includes the check from which type of port the frame comes. In an alternative 806 the DHCP frame comes on one of the subscriber ports P1, P2, P3 and is then accepted in the block 805. In an alternative 807 the DHCP frame instead comes on the uplink port PN. It is then checked in a block 808 by the task (8), the list L1, whether the DHCP frame originates from a valid DHCP server. In an alternative NO8 the server is not valid and the frame is discarded in a block 809, performing the task (5). In an alternative YES8 the server is found to be valid and a check is performed by the task (9) in a block 810. The check includes the question whether the frame is a DHCP acknowledge message. If it isn't according to an alternative NO9, the frame is accepted in a block 811, performing the task (6). In an opposite alternative YES9 the frame is a DHCP acknowledge frame and is then handled in a block 812, performing the task (10). This task includes that the layer 3 IP address and the lease time interval are added in the database 7. Then the information about the layer 2 source MAC address, the layer 3 IP address, the port identification, the lease time interval and the virtual LAN identification for the subscriber are inserted in the table TAB1. The frame is then accepted, task (6) in the block 811.

The process when the subscriber 6 gets an IP address will be described very briefly in connection with FIG. 8. In the discovery phase the discovery message M1 is received in block 801 and is found to be a DHCP message in block 802. According to the alternative 806 it is found to come from the subscriber and the message M1 is accepted in block 805. The DHCP offer message M2 from the DHCP servers is received in block 801, found to be a DHCP message in block 802 and found to be a response message according to the alternative 807. The DHCP server is a valid one according to block 808, the message M2 is no acknowledge message, block 810 and is accepted in block 811 and forwarded to the subscriber 6. The latter selects the address IP1 and requests it by the message M3, which is received in block 801. In block 802 it is noted as a DHCP message which comes from the subscriber, alternative 806, and is accepted in block 805. The server gets the message M3 and returns the acknowledge message M4. In block 801 the message M4 is received, is found to be a DHCP message in block 802 and to be a response message, alternative 807. The message source is valid, block 808, and the message M4 is found to be an acknowledge message, block 810 alternative YES9. In block 812 the address IP1 and its lease time interval T1 are added in the database 7 and the table TAB1 in the IP filter 9 is filled in. The message M4 is accepted, block 811, and the subscriber 6 gets the address and its lease time interval T1. The subscriber 6 has a valid IP address.

When the subscriber 6 sends the message M5 to the service provider 3, the message is received in block 801 and is found not to be a DHCP message, block 802 alternative NO6. The frame source information is then checked in block 803 with the aid of the table TAB1 in the filter 9. If valid, alternative YES7, the message M5 is accepted and is sent to the addressee.

The invention claimed is:

[1. A method for preventing illegitmate use of an Internet Protocol (IP) address by a subscriber device in an IP network, the network including a switch node and at least one DHCP server, said subscriber device in communication with the switch node, the method including the steps of:

creating a list of trusted ones of the DHCP servers in said switch node;

transmitting by the subscriber device a DHCP request message for an IP address;

receiving a reply message by said switch node which carries an assigned subscriber IP address;

analysing the reply message by said switch node to be a DHCP message and having a source address from one of the trusted DHCP servers;

updating a filter dynamically in the switch node, the filter storing an identification of the subscriber device and the assigned subscriber IP address;

transmitting a frame from the subscriber device using a source IP address;

comparing in the filter said source IP address with the stored subscriber IP address; and, discarding said frame when said source IP address differs from the stored subscriber IP address.]

[2. The method according to claim 1, further comprising the step of storing in the filter a subscriber MAC address, a subscriber physical port number, a subscriber virtual LAN identity and a lease time interval for the assigned subscriber IP address.]

[3. The method according to claim 1, wherein the subscriber IP address is statically assigned and handled by the DHCP servers.]

[4. The method according to claim 2, the method including deleting the subscriber identification and the corresponding assigned subscriber IP address from the filter when the lease time interval is out.]

[5. The method according to claim 1, the method further comprising the steps of:

counting a number of attempts (n) from the subscriber to use an illegitimate IP address;

comparing the number (n) of the attempts with a threshold number (N);

sending a warning signal when the number of attempts exceeds a threshold criteria.]

[6. A switch node in an Internet Protocol (IP) network adapted to prevent illegitmate use of an IP address by a subscriber device, the switch node including:

at least one port for communication with a subscriber device;

an uplink port for communication with DHCP servers in the network; and, a filter device having a list of trusted ones of the DHCP servers, the filter device being associated with the ports; wherein the switch node is operative to:

receive a subscriber IP address request message from a subscriber device, analyse it to be a DHCP request message and transmit it on the uplink port;

receive a reply message on the uplink port, analyse it to be a DHCP reply message having a source IP address from one of the trusted DHCP servers on the list;

dynamically update the filter with an identification of the subscriber device and a corresponding assigned subscriber IP address contained in the DHCP reply message;

receive a frame with a source IP address from a subscriber device;

compare in the filter said source IP address with the stored subscriber IP address for the subscriber device; and, to discard said frame when said source IP address differs from the stored subscriber IP address.]

[7. The switch node according to claim 6, wherein the switch node is further operative to store in the filter a subscriber MAC address, a subscriber physical port number, a subscriber virtual LAN identity and a lease time interval for the assigned subscriber IP address.]

[8. The switch node according to claim 6, wherein the subscriber IP address comprises a statically assigned address which is handled by the DHCP servers.]

[9. The switch node according to claim 7, wherein the switch node is further operative to delete the subscriber identification and the corresponding assigned subscriber IP address from the filter when the lease time interval is out expires.]

[10. The switch node according to claim 6, wherein the filter comprises a counter operative to count a number (n) of discarded frames on the subscriber port, to compare the number (n) of the discarded frames with a threshold number (N), and to send a warning signal when the number of discarded frames exceeds a threshold criterion.]

*11. A method in a switch node coupled upstream to at least one Dynamic Host Configuration Protocol (DHCP) server and coupled downstream to at least one subscriber device, the method including the steps of:*

*creating a first table of trusted ones of the DHCP servers in the switch node;*

*receiving, by the switch node, from the at least one subscriber device, a DHCP request message for an IP address*

*transmitting, by the switch node, the DHCP request message to one of the trusted DHCP servers;*

*receiving, by the switch node, a reply message from the trusted DHCP server, the reply including an assigned subscriber IP address;*

*analysing the reply message by the switch node to be a DHCP message and having a source address from one of the trusted DHCP servers according to the first table;*

*updating a second table dynamically in the switch node, the second table storing an identification of the subscriber device and the assigned subscriber IP address;*

*transmitting, by the switch node, to the subscriber device, a reply message which carries the assigned subscriber IP address;*

*receiving, by the switch node, a frame from the subscriber device using a source IP address;*

*comparing the source IP address with the stored subscriber IP address in the second table;*

*discarding the frame when the source IP address differs from the stored subscriber IP address of the second table; and*

*accepting the frame when the source IP address matches the stored subscriber IP address of the second table.*

*12. The method according to claim 11, further comprising the step of storing in the second table a subscriber MAC address, a subscriber physical port number, a subscriber virtual LAN identity and a lease time interval for the assigned subscriber IP address.*

*13. The method according to claim 11, wherein the subscriber IP address is statically assigned and handled by the DHCP servers.*

*14. The method according to claim 12, the method including deleting the subscriber identification and the corre-*

*sponding assigned subscriber IP address from the second table when the lease time interval is out.*

*15. The method according to claim 11, the method further comprising the steps of:*

*counting a number of attempts (n) from the subscriber to use an IP address that does not match that contained in the second table;*

*comparing the number (n) of the attempts with a threshold number (N);*

*sending a warning signal when the number of attempts exceeds the threshold number.*

*16. A switch node configured to prevent illegitmate use of an IP address by a subscriber device, the switch node comprising:*

*at least one downlink port for communication with a subscriber device;*

*at least one uplink port for communication with at least one Dynamic Host Configuration Protocol (DHCP) server in a network; and,*

*a first table having a list of trusted ones of the DHCP servers, the first table being associated with the ports;*

*processing circuitry; and*

*a memory, the memory containing instructions that, when executed by the processing circuitry, cause the switch node to:*

*receive a subscriber IP address request message from a subscriber device, analyse it to be a DHCP request message and transmit it on the uplink port;*

*receive a reply message on the uplink port, analyse it to be a DHCP reply message having a source IP address from one of the trusted DHCP servers in the first table;*

*dynamically update a second table with an identification of the subscriber device and a corresponding assigned subscriber IP address contained in the DHCP reply message;*

*receive a frame with a source IP address from a subscriber device;*

*compare the source IP address with the stored subscriber IP address for the subscriber device in the second table;*

*discard the frame when the source IP address differs from the stored subscriber IP address; and*

*accept the frame when the source IP address matches the stored subscriber IP address of the second table.*

*17. The switch node according to claim 16, wherein the switch node is further operative to store in the second table a subscriber MAC address, a subscriber physical port number, a subscriber virtual LAN identity and a lease time interval for the assigned subscriber IP address.*

*18. The switch node according to claim 16, wherein the subscriber IP address comprises a statically assigned address which is handled by the DHCP servers.*

*19. The switch node according to claim 17, wherein the switch node is further operative to delete the subscriber identification and the corresponding assigned subscriber IP address from the filter when the lease time interval expires.*

*20. The switch node according to claim 16, further comprising a counter operative to count a number (n) of discarded frames on the subscriber port, to compare the number (n) of the discarded frames with a threshold number (N), and to send a warning signal when the number of discarded frames exceeds the threshold number.*

* * * * *